S. IDE.
Bee Hive.
No. 31,890.
Patented April 2, 1861.
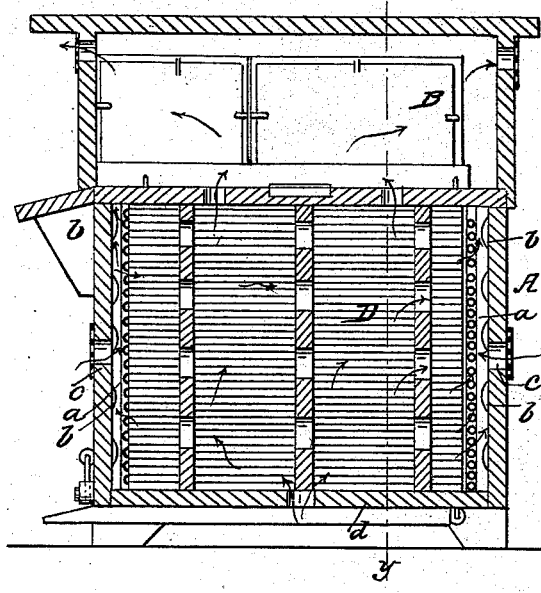
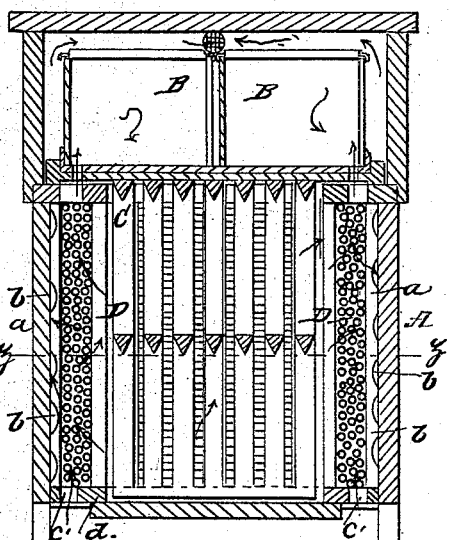
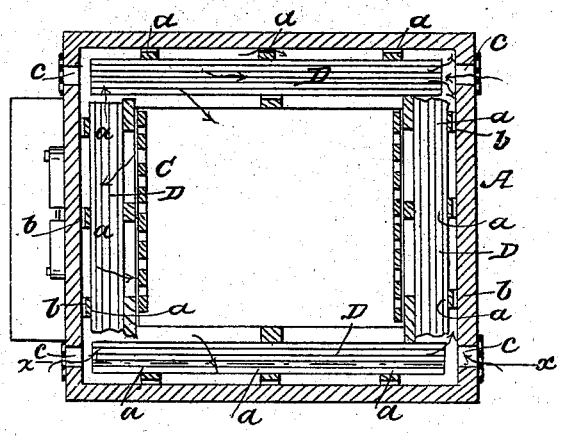
Witnesses
J W Coombs
R. S. Spencer
Inventor
Sam'l Ide
per Munn & Co
Attorneys

UNITED STATES PATENT OFFICE.

SAMUEL IDE, OF EAST SHELBY, NEW YORK.

BEEHIVE.

Specification of Letters Patent No. 31,890, dated April 2, 1861.

*To all whom it may concern:*

Be it known that I, SAMUEL IDE, of East Shelby, in the county of Orleans and State of New York, have invented a new and useful Improvement in Beehives; and I do hereby declare that the following is a full, clear, and exact description of the same, reference being had to the annexed drawings, making a part of this specification, in which—

Figure 1 is a vertical section of a hive constructed according to my invention, and taken in the line $x$, $x$, Fig. 3. Fig. 2 is a vertical section of the same taken in the line $y$, $y$, Fig. 1. Fig. 3 is a horizontal section of the same taken in the line $z$, $z$, Fig. 2.

Similar letters of reference indicate corresponding parts in the several figures.

The object of this invention is to render bee hives more suitable than those hitherto constructed for the wintering of bees, so that the same may be kept through severe cold weather without having their number diminished, as is generally the case, in consequence of the ordinary hives being poorly ventilated and not constructed sufficiently warm.

Bees, as is well known to apiarists, keep themselves warm in winter by collecting together in a mass within the hive, the animal heat being sufficient for the purpose. The moisture exhaled by the bees condenses in ill ventilated hives, and if the hives are thin and not protected from the cold the moisture freezes and the bees are frequently smothered and perish within a casing of ice; and if the hives are well protected from the cold the long continued moisture within the hive engenders disease which destroys the occupants, and causes the comb to mold. To obviate these difficulties I employ a lining of straw between the walls of the hive and the comb frame or box, the straw being laid or so disposed to form horizontal tubes to serve as venti-ducts, the absorbent quality of the straw taking the moisture from the interior of the hive while the circulation of air through the straw and around it carries it off from the hive; the non-conducting quality also of the straw keeping the hive in a warm condition favorable for the bees.

To enable those skilled in the art to fully understand and construct my invention I will proceed to describe it.

A represents the body of the hive which may be of rectangular form and provided as usual with spare honey boxes B, placed above the comb-frames or box C, as shown in Figs. 1 and 2. The hive may be constructed of boards or plank in the ordinary way.

Between the comb frame or box C, and the walls of the hive there is a space all around the hive in which space straw D, is placed horizontally so as to form a series of tubes and spaces are allowed both at the inner and outer sides of the straw so as to admit of a circulation of air at each side of the straw as well as through it; strips $a_1$ which are attached to the inner sides of the hive and against which the outer side of the straw bears being notched as shown at $b$, to allow the air to pass freely around at the outer side of the straw.

The hive A, is perforated at its front and back ends as shown at $c$. These holes or perforations are covered with wire cloth and serve as ventilators, the holes being directly at the ends of the layers of straw. More or less of these holes or openings may be used as occasion may require. In Fig. 3, two are shown at the front and two at the back of the hive. The holes or openings may be covered with wire cloth to prevent the ingress of insects. Holes $c$, may also be made in the bottom of the hive directly below the straw D. The straw D, should extend from the bottom $d$, of the hive to the top of the comb-frame or box C.

From the above description it will be seen that the straw D, being naturally absorbent will imbibe the moisture from the hive, while the circulation of air through the straw venti-ducts, and around them will carry off the moisture and the straw being a good non-conductor of heat will keep the hive warm and comfortable for its occupants.

I am aware that hives made wholly of straw have heretofore been employed, and also that a double cased hive with straw or hay stuffed between the casing; these I expressly disclaim; but

Having thus described my invention what I claim as new and desire to secure by Letters Patent, is:—

Having the hive constructed with an inner wall composed of straw or other equally porous material, when the said straw or porous wall is separated from the outer case so as to leave an air space; and used in connection with ventilating apertures all substantially as herein shown and described for the purposes set forth.

SAMUEL IDE.

Witnesses:
 JAMES H. WHITMORE,
 D. W. COLE.